United States Patent [19]

Goldmann et al.

[11] Patent Number: 5,304,244
[45] Date of Patent: Apr. 19, 1994

[54] ZWITTERIONIC PIGMENTS

[75] Inventors: Jürgen Goldmann, Münchenstein; Bansi L. Kaul, Biel-Benken, both of Switzerland

[73] Assignee: Sandoz Ltd., Basel, Switzerland

[21] Appl. No.: 18,616

[22] Filed: Feb. 17, 1993

Related U.S. Application Data

[63] Continuation of Ser. No. 825,363, Jan. 24, 1992, abandoned.

[30] Foreign Application Priority Data

Jan. 26, 1991 [DE] Fed. Rep. of Germany ....... 4102333

[51] Int. Cl.$^5$ ................................................ C08K 5/23
[52] U.S. Cl. ................................. 106/493; 106/496; 106/498; 428/543
[58] Field of Search ............. 106/493, 496, 498; 428/543

[56] References Cited

U.S. PATENT DOCUMENTS

| | | | |
|---|---|---|---|
| 3,556,708 | 1/1971 | Randall | 8/39 |
| 4,218,373 | 8/1980 | Wolfrum et al. | 534/878 |
| 4,273,707 | 6/1981 | Pedrazzi | 534/797 |
| 4,317,682 | 3/1982 | Katsura et al. | 106/288 |
| 4,367,172 | 1/1983 | Pedrazzi | 534/797 |
| 4,395,545 | 7/1983 | Adam et al. | 544/74 |
| 4,435,334 | 3/1984 | Stohr et al. | 558/394 |
| 4,654,384 | 3/1987 | Ramanathan et al. | 534/604 |
| 4,863,522 | 9/1989 | Jost et al. | 106/494 |
| 4,866,113 | 9/1989 | Bitterli et al. | 524/87 |
| 5,037,448 | 8/1991 | Kaul et al. | 8/539 |
| 5,189,153 | 2/1993 | Gregory et al. | 540/122 |

FOREIGN PATENT DOCUMENTS

| | | |
|---|---|---|
| 61624 | 10/1982 | European Pat. Off. . |
| 2616981 | 10/1977 | Fed. Rep. of Germany . |
| 1231891 | 4/1960 | France . |
| 1335075 | 7/1963 | France . |
| 59-147054 | 8/1984 | Japan . |
| WO89/10384 | 11/1989 | PCT Int'l Appl. . |
| 1351976 | 5/1974 | United Kingdom . |
| 2182157 | 5/1987 | United Kingdom . |
| 2236536 | 4/1991 | United Kingdom . |

OTHER PUBLICATIONS

Freeman et al., Dyes and Pigments 17, 83–100 (1991).

*Primary Examiner*—Karl Group
*Assistant Examiner*—Scott L. Hertzog
*Attorney, Agent, or Firm*—Robert S. Honor; Melvyn M. Kassenoff

[57] ABSTRACT

Pigments of the formula $$A_m-F-R_n,$$

wherein
each A is a monobasic or dibasic acid group,
F is the residue of a dye,
each R is a group containing an aliphatic-, cycloaliphatic- or aliphatic-heterocyclic-bound imino or amino nitrogen atom,
m is 1 or 2, and
n is equal to m when A is a monobasic acid group and equal to 2m when A is a dibasic acid group.

12 Claims, No Drawings

ZWITTERIONIC PIGMENTS

This a continuation of application Ser. No. 07/825,363, filed Jan. 24, 1992 and now abandoned.

The invention relates to zwitterionic pigments, particularly useful for colouring plastics material.

According to the invention there is provided a pigment containing one or more recurring units derived from monomer units of formula I

  (I)

in which
A is a mono- or di-basic acid group;
R is a group containing an aliphatic, cycloaliphatic or aliphatic-heterocyclic bound imino or amino nitrogen atom;
F is a dyestuff residue;
m is 1 or 2; and
n, when A is a monobasic acid group, has the same significance of m and
n, when A is a dibasic acid group, has the same significance of 2m.

As the pigment does not dissolve in the usual solvents the invention generally can be considered also to relate to a pigment of formula Ia

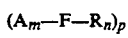  (Ia)

in which
A, m, F, R and n are as defined above and
p is from 2 to 30.

Further according to the invention there is provided a polymeric material to which a pigment according to the invention has been applied.

Preferably A is A' where A' is selected from

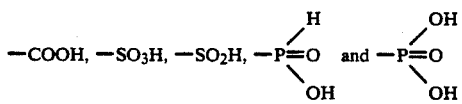

Preferably R is R' where R' is a group containing a sterically hindered amine group (often known as a HALS—hindered amine light stabiliser group in the art).

More preferably R is R" where R" is a group of formula a) to e)

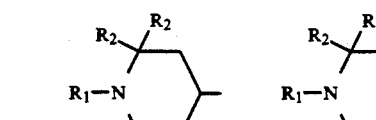

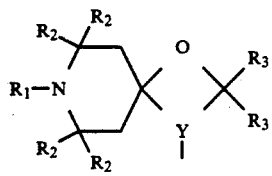

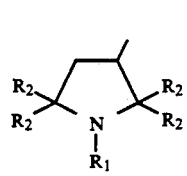

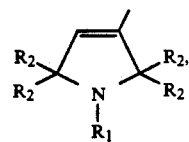

(e)

in which
$R_1$ is hydrogen, $C_{1-4}$alkyl, $C_{1-4}$alkoxy, or —CO—$C_{1-4}$alkyl; (preferably, $R_1$ is $R_1'$ where $R_1'$ is methyl or preferably, hydrogen);
each $R_2$ independently is $C_{1-4}$alkyl (preferably each $R_2$ is methyl);
each $R_3$ independently is hydrogen or $C_{1-4}$alkyl or one group $R_3$ only can additionally be phenyl or both groups $R_3$ together can be the spiro group —(—$CH_2$—)$_{11}$—, and

is a group

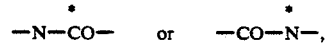

the carbon atom and the nitrogen atom being positioned in such a way that, together with the carbon atoms to which Y is attached and the oxygen atom adjoining said carbon atoms, a five membered moiety is formed and wherein the starred atoms are attached to the $R_3$-bearing carbon atom.

These sterically hindered amine groups are preferably bound to a carbocyclic or heterocyclic group of aromatic character of group F by way of an ester or amide forming group.

Most preferably R is R''' where R''' is 2,2,6,6-tetramethylpiperidinyl-4- or 1,2,2,6,6-pentamethylpiperidinyl-4.

Preferably F is F' where F' is the residue of a dyestuff of the monoazo, di.sazo, anthraquinone, perinone, acetanilide or isoindoline series.

More preferably F is F" where F" is the residue of a dyestuff of the azo or anthraquinone series.

Preferably A is A" where A" is a sulphonic acid or carboxylic acid group, most preferably A is a sulphonic acid group.

Preferably m is 1.

Preferably n is 1 or, when A is a phosphonic acid group, additionally 2.

Preferred pigments according to the invention are pigments containing one or more recurring units derived from monomer units of formula I in which
A is a sulphonic acid or carboxylic acid group (preferably a sulphonic acid group);
R is R''' where R''' is 2,2,6,6-tetramethylpiperidinyl-4- or 1,2,2,6,6-pentamethylpiperidinyl-4;
F is F" where F" is the residue of a dyestuff of the azo or anthraquinone series; and
M and N are both 1.

Preferred compounds of formula I are those of the formula

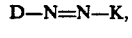

in which
- D is a diazo component radical of the benzene series, and
- K is a coupling component radical of the benzene, 1- or 2-hydroxynaphthalene, 5-hydroxypyrazole or 6-hydroxypyrid-2-one series;

with the proviso that each compound contains one or two A' groups (more preferably one A' group, even more preferably one sulfo group) and an equal number of R" groups.

Preferably D is D', where D' is phenyl or phenyl substituted by one to three substituents independently selected from halo, $C_{1-4}$alkyl, $C_{1-4}$alkoxy, —$SO_2N(R_4)_2$' —$COOC_{1-4}$alkyl, A', —CO—NH—R", —$SO_2$—NH—R" and —COO—R", wherein each $R_1$ is independently hydrogen or $C_{1-4}$alkyl, with the provisos that (i) D' contains a maximum of two A' groups, (ii) D' contains a maximum of two R"-containing groups, and (iii) when D' contains one or two A' groups, it contains no R"-containing group.

More preferably, D is D", where D" is phenyl or phenyl substituted by one or two substituents independently selected from chloro, methyl, methoxycarbonyl, —$SO_3H$ and —CO—NH—R''', wherein R''' is a group of formula a, more preferably a group of formula a wherein $R_1$ is $R_1$', and each $R_2$ is methyl, with the proviso that D" contains one —$SO_3H$ group or one —CO—NH—R''' group.

K is preferably K', where K' is a group of formula a') to f')

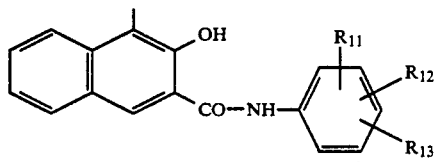
(a')

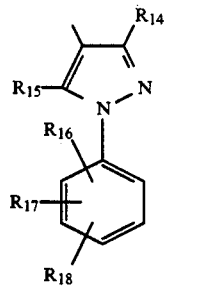
(b')

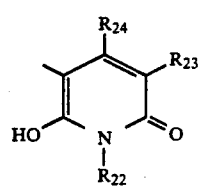
(c')

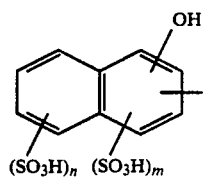
(d')

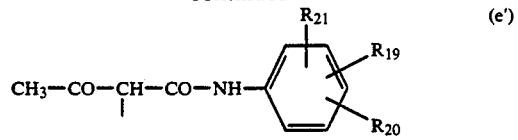
(e')

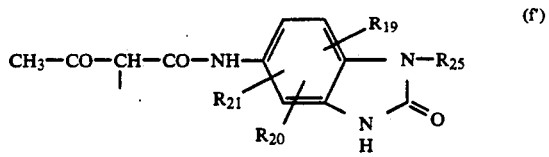
(f')

wherein
- $R_{11}$ is A', —CO—NH—R", —$SO_2$—NH—R" or —COO—R",
- $R_{12}$ is hydrogen, $C_{1-4}$alkyl, $C_{1-4}$alkoxy or halo (preferably chloro or bromo),
- $R_{13}$ is hydrogen, $C_{1-4}$alkyl, $C_{1-4}$alkoxy or halo (preferably chloro or bromo), (preferably hydrogen,
- $R_{14}$ is $C_{1-2}$alkyl, —COOH or —$CONH_2$,
- $R_{15}$ is hydroxy or amino,
- $R_{16}$ is hydrogen, A', —CO—NH—R", —$SO_2$—NH—R" or —COO—R",
with the proviso that $R_{16}$ may be hydrogen only when $R_{14}$ is —COOH,
- $R_{17}$ is hydrogen, halo (preferably chloro or bromo), $C_{1-4}$alkyl or $C_{1-4}$alkoxy, or but only when $R_{16}$ is A',
- $R_{18}$ is hydrogen, chloro or methyl,
- $R_{19}$ is hydrogen A', —CO—NH—R", —$SO_2$—NH—R" or —COO—R",
- $R_{20}$ is hydrogen, halo (preferably chloro or bromo), $C_{1-4}$alkyl or $C_{1-4}$alkoxy, preferably hydrogen,
- $R_{21}$ is hydrogen, chloro or methyl, preferably hydrogen,
- $R_{22}$ is R",
- $R_{23}$ is hydrogen or cyano, preferably
- $R_{24}$ is $C_{1-4}$alkyl, cyclohexyl or phenyl preferably methyl,
- $R_{25}$ is R",
- m is 0 or 1, and
- n is 0, 1 or 2, with the proviso that m+n is 1 or 2. Preferably in formula f' $R_{19}$ is hydrogen.

In the above substituents preferably any $C_{1-4}$alkyl or $C_{1-4}$alkoxy can be $C_{1-3}$alkyl or $C_{1-3}$alkoxy. In formula d', the OH group is in the 1- position and the free valence is in the 2-position or vice versa.

The pigments according to the invention can be made from known compounds by known methods, for example by reacting a compound containing m groups of A with a compound containing n groups of R whereby one or the other of the components contains the group F or both compounds contain a precursor that, on reaction, forms F.

For example azo pigments according to the invention can be prepared by coupling the appropriate diazotised amino component with the appropriate coupling component, whereby in one component group A is present and in the other component the group R is present.

The other pigment type compounds according to the invention can be prepared by reacting exchangeable groups of an acid or basic dyestuff with a group capable of reacting, e.g., an alkylamino group or an acid group containing compound. Also addition reactions (e.g., with acrylic or methacrylic acid) or carboxymethylation of a basic dyestuff can occur to produce pigments according to the invention. Such methods are known to a man skilled in the art.

The pigments according to the invention can be used to colour solvent-free and solvent containing plastics material.

The pigments according to the invention are excellent for colouring PVC, all types of polyolefin (HDPE or LDPE (high density polyethylene or low density polyethylene) or polypropylene) polyisobutylene, poly-4-methylpentene and copolymers of these.

Further, the compounds according to the invention can be used for coloring polystyrene (and copolymers thereof), ABS, polyvinylacetate, polyvinylalcohol, polyacetates, polyether (POM), polyacrylates, polyacrylonitrile, polyacrylamide, polyvinylidenechloride, polyesters, polyethers, polythioethers and thioplasts, polycarbonates, polyurethanes, cellulose derivatives, maleic acid, melamine, phenol, aniline, furane, carbamide, epoxide and silicone resins.

The pigments of formula I can also be used in lacquers and printing inks for the graphics industry.

Preferably the pigments according to the invention are particularly useful in colouring polyethylene and polypropylene, polyvinylchloride (PVC), polystyrene, acrylics, polyester alkyd or polyurethane lacquers.

Properties of the pigments can be further improved by aftertreatment with high boiling organic solvents, such as those selected from dimethylformamide dimethylacetamide and high boiling alcohols.

Preferred polymeric material and methods for applying the pigment are described in U.S. Pat. No. 3,997,521, the contents of which is incorporated herein by reference.

Not only do the pigments have good light fastness properties, but they also impart good light fastness properties to the substrates to which they are applied.

Preferably the amount of pigment taken up by the substrate is from 0.1 to 10% inclusive based on the weight of the substrate.

Furthermore the pigments of formula I are generally mixtures of pigments of formula I wherein the A's, F's, R's, m's and n's are identical but wherein the p's (in formula Ia) differ.

Each of the pigments of Examples 1–43 below (and the other pigments of this invention), irrespective of how depicted in this specification, is in Zwitterionic form. The (or each, if two are present) cationic group of each molecule may be associated with the (or an, if two are present) anionic group of the same molecule or, as is usually the case, with the anionic group of a different molecule.

The invention will now be illustrated with reference to the following Examples. All temperatures are in ° C. and any part by volume represents the volume of a part by weight at +4° C.!

EXAMPLE 1

33.3 parts of 3-amino-4-carbomethoxybenzoic acid-2′,2′,6′,6′-tetramethylpiperidyl-4′-amide are stirred for one hour in a solution of 50 parts glacial acetic acid and 50 parts of water at room temperature. Then 40 parts of concentrated HCl are added, and the mixture is stirred for a further hour at room temperature and then cooled by the use of an ice/water bath and the addition of 50 parts ice to 0° to 5° C. Over 15 to 20 minutes whilst stirring well, the mixture is reacted with 26 parts by volume of 4N aqueous sodium nitrite and cooled for an hour at 0° to 5° C. The resulting diazonium chloride solution is then clear filtered.

25.4 parts of 1-phenyl-3-methyl-5-pyrazolone-4′-sulphonic acid is dissolved in 100 parts of water and 20 parts by volume of 20% NaOH (30%) at room temperature. By the slow addition of a solution of 100 parts of water and 21 parts of ice, the product is precipitated, and the suspension is cooled to 0° to 5° C. and over 30 and over 30 minutes whilst stirring is reacted with the cooled diazonium solution.

The resulting yellow suspension is stirred for three hours at 0° to 5° C., for one hour at 20° C. and for one hour at 80°-85° C., after which it is filtered, and the precipitate is washed salt and acid free. The product is dried at 80° C. and then milled. The resulting product is a yellow pigment of the formula 1a (shown as the monomer)

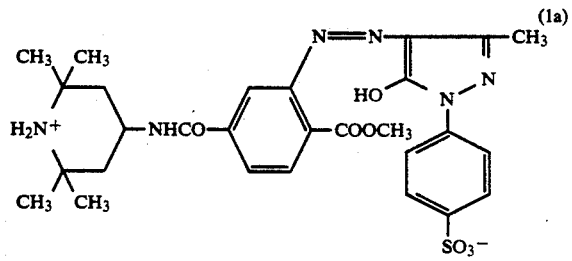

The product of formula 1a colours plastics and lacquers a yellow tone and has good fastness properties.

EXAMPLE 2

40.4 parts of the sodium salt of 1-amino-4-bromoanthraquinone-2-sulphonic acid are stirred in 300 parts of water at room temperature with 2.0 parts of CuCl (copper I chloride) and 31.2 parts of 2,2,6,6-tetramethyl-4-aminopiperidine for one hour. The mixture is heated to 80° C. and a deep blue suspension results. This is stirred for four hours at 80°-85° C. and for two hours at 100°-105° C., then cooled to about 80° C. and the precipitate is filtered. The precipitate is then washed acid free and salt free with water and is dried at 100° C. under vacuum at about 65 mbars. The resulting pigment is purified by treatment with 400 mls of dimethylformamide at 100° C. for 2 hours and after filtration and drying is milled. The resulting pigment is of formula 2a (shown in its monomeric form)

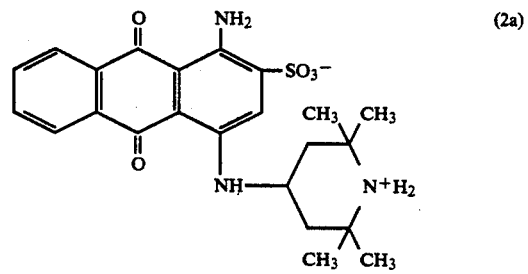

and colours plastics and lacquers a blue tone and has good fastness properties.

A pigment of similar properties can be produced when Example 1 is repeated using, instead of 3-amino-4-carbomethoxybenzoic acid-2′,2′,6′,6′-tetramethylpiperidyl-4′-amide, an equivalent amount of 3-amino-4-carbomethoxybenzoic acid-1',2',2',6', 6'-pentamethyl piperidyl-4'-amide.

EXAMPLES 3–29

Compounds of the formula

D—N=N—K where D and K are defined in the Table below can be made from known compounds by a method analogous to that of Example 1.

TABLE 1

| Ex. No. | D (Diazo Component) | K (Coupling Component) | Nuance of Dyeing |
|---|---|---|---|
| 3 | 3-Amino-4-chlorobenzoic acid 2',2',6',6'-tetramethyl-piperidyl-4'-amide | 2-Hydroxy-3-Phenylaminocarbonylnaphthalene-4'-sulphonic acid | red |
| 4 | 4-Aminobenzoic acid 2',2',6',6'-tetramethyl-piperidyl-4'-amide | 2-Hydroxynaphthalene-6-sulphonic acid | " |
| 5 | 2,5-Dichloro-4-aminobenzene-sulphonic acid-2',2',6',6'-tetramethylpiperidyl-4'-amide | 2-Hydroxy-3-Phenylaminocarbonylnaphthalene-4'-sulphonic acid | " |
| 6 | 4-Amino-3-carbomethoxy-benzoic acid-2',2',6',6'-tetramethylpiperidyl-4'-amide | 2-Hydroxy-3-Phenylaminocarbonylnaphthalene-4'-sulphonic acid | " |
| 7 | 4-Amino-3-carbomethoxy-benzoic acid-2',2',6',6'-tetramethylpiperidyl-4'-amide | 1-Hydroxynaphthalene-4-sulphonic acid | " |
| 8 | 4-Amino-3-carbomethoxy-benzoic acid-2',2',6',6'-tetramethylpiperidyl-4'-amide | 4-Acetoacetylaminobenzene-sulphonic acid | yellow |
| 9 | 4-Amino-3-carbomethoxy-benzoic acid-2',2',6',6'-tetramethylpiperidyl-4'-amide | 1-Phenyl-3-methyl-5-pyrazolone-4'-sulphonic acid | " |
| 10 | 4-Amino-3-carbomethoxy-benzoic acid-2',2',6',6'-tetramethylpiperidyl-4'-amide | 1-Phenyl-3-methyl-5-pyrazolone-2'-methyl-4'-sulphonic acid | " |
| 11 | 4-Amino-3-carbomethoxy-benzoic acid-2',2',6',6'-tetramethylpipridyl-4'-amide | 1-Phenyl-3-methyl-5-pyrazolone-2'-chloro-4'-sulphonic acid | " |
| 12 | 2,5-Dichloro-4-aminoben-zenesulphonic acid | 1-Phenyl-3-methyl-5-pyrazolone-4'-carboxylic acid-2'',2'',6'',6''-tetramethylpiperidyl-4''-amide | " |
| 13 | 2-Amino-4,5-dichloro-benzenesulphonic acid | 1-Phenyl-3-methyl-5-pyrazolone-4'-carboxylic acid-2'',2'',6'',6''-tetramethylpiperidyl-4''-amide | " |
| 14 | 2-Amino-4-chloro-5-methyl-benzenesulphonic acid | 1-Phenyl-3-methyl-5-pyrazolone-4'-carboxylic acid-2'',2'',6'',6''-tetramethylpiperidyl-4''-amide | " |
| 15 | 5-Aminoisophthalic acid-di-(2',2',6',6'-tetramethyl-piperidyl-4'-amide) | 1-Phenyl-3-methyl-5-pyrazolone-2',5'-disulphonic acid | " |
| 16 | 2,5-Dichloro-4-aminobenzene-sulphonic acid | 1-(2',2',6',6'-tetramethyl-piperidyl-4-)-2-hydroxy-4-methyl-5-cyanopyridene-6 | " |
| 17 | 3-Amino-4-carbomethoxy-benzoic acid-2',2',6',6'-tetra-methylpiperidyl-4-ester | 2-Hydroxy-3-phenylamino-carbonylnaphthalene-4'-sulphonic acid | red |
| 18 | 2-Amino-4,5-dichlorobenzene sulphonic acid | 4-Acetoacetylaminobenzoic acid-2',2',6',6'-tetra-methylpiperidyl-4'-amide | yellow |
| 19 | 2-Amino-4,5-dimethyl-benzene sulphonic acid | 4-Acetoacetylaminobenzoic acid-2',2',6',6'-tetra-methylpiperidyl-4'-amide | " |

TABLE 1-continued

| Ex. No. | D (Diazo Component) | K (Coupling Component) | Nuance of Dyeing |
|---|---|---|---|
| 20 | 2,5-Dichloro-4-aminobenzene-sulphonic acid | ![structure with naphthol-OH, CONH-phenyl-CO-NH-tetramethylpiperidine] | red |
| 21 | 4-Aminobenzoic acid | " | " |
| 22 | 3-Amino-4-carbomethoxy-benzoic acid | " | " |
| 23 | 4-Aminobenzenephosphinic acid | " | " |
| 24 | 3-Aminobenzenephosphinic acid | " | " |
| 25 | 2,5-Dichloro-4-aminobenzene-sulphonic acid | " | " |
| 26 | 2-Chloro-4-aminobenzenesulphinic acid | " | " |
| 27 | 2,5-Dichloro-4-aminobenzene-sulphonic acid | ![structure with benzimidazolone-acetoacetylamino-tetramethylpiperidine] | yellow |
| 28 | 2,5-Dichloro-4-aminobenzenesulphinic acid | " | " |
| 29 | 4-Aminobenzenesulphinic acid | " | " |

EXAMPLE 30

By a method analogous to that of Example 2, 1 mole of 1-amino-4-bromoanthraquinone-2-sulphonic acid and 1 mole of 4-aminobenzoic acid-2',2',6',6'-tetramethyl-piperidyl-4-amide can be used to prepare a blue pigment with good fastness properties.

EXAMPLE 31

1 mole of 3,4,9,10-perylenetetracarboxylic acid dianhydride can be reacted by a method analogous to that of Example 1 with 1 mole of 2,2,6,6-tetramethyl-4-aminopiperidine and then reacted with 1 mole of sulphanilic acid to for a pigment of formula 31a This colours plastics material a red tone and has good fastness properties.

EXAMPLE 32

By a method analogous to that of Example 1, 1 mole of 3-aminobenzenephosphonic acid is diazotised and is coupled with 1 mol of 1,3-Bis-(2',2',6',6'-tetramethyl-piperidyl-4'-)-5-acetoacetylaminobenzimidazolone-2. A yellow colouring pigment results with good properties.

EXAMPLES 33 to 35

The following pigments can be made from appropriate starting material by a method analogous to that of Example 1.

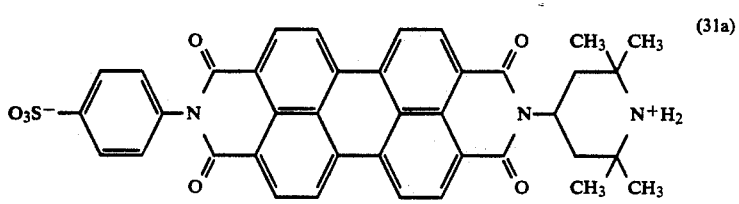

(31a)

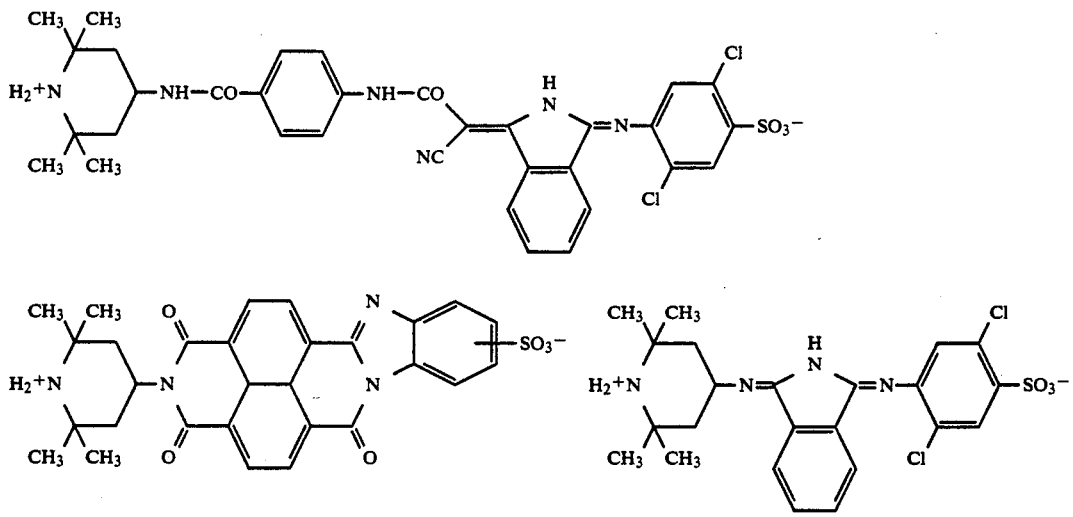

EXAMPLES 36 to 43

Examples 20 to 26 are repeated using instead of 2-hydroxy-3-[para-(2',2',6',6'-tetramethylpiperidyl-4-aminocarbonyl)phenylaminocarbonyl]-naphthalene an equivalent amount of 2-hydroxy-3-[para-(1',2', 2', 6', 6'-pentamethylpiperidyl-4-aminocarbonyl)-phenylaminocarbonyl]-naphthalene.

The resulting pigments have almost the same properties.

An aftertreatment in high boiling point solvents at temperatures of 80°-180° C. of a pigment made according to any one of Examples 1 to 43 can improve the brilliance and handling properties of the pigments.

APPLICATION EXAMPLE A 4 parts of the pigment of Example 1 are ground together with 96 parts of a mixture of
50 parts of 60% solution of Coco-aldehyde-melamine resin having a fat content in Xylene of 32%,
30 parts of 50% melamine resin solution in butanol,
10 parts of xylene and
10 parts of ethylene glycol monoethylether
for 24 hours in a ball mill. The resulting dispersion is then sprayed onto an aluminum sheet, dried for 30 minutes in air and then stoved for 30 minutes at 120°. A brilliant yellow film with very good light and weathering properties results.

APPLICATION EXAMPLE B

A 0.1% dye colored PVC sheet (colored pigment to white pigment ratio being 1:5) can be made as follows;
16.5 parts of a mixture of equal parts of dioctylphthalate and dibutylphthalate are mixed
0.05 parts of the pigment of Example 1;
0.25 parts of titanium dioxide and
33.5 parts of polyvinylchloride are added.

The mixture is then rolled between two rollers to produce a sheet that is cut up with a spatula and rolled together again. One of the rollers is kept at a temperature of 40° the other at a temperature of 140°. Finally the mixture is then taken off as a sheet and pressed between to polishing metal plates 160° for 5 minutes.

A yellow colored PVC folio having a high brilliance and very good migration and light fastness properties result.

APPLICATION EXAMPLE C 990 parts of a commercially available UV stabilised Polypropylene (spin fibre type) is mixed with 10 parts of the pigment of Example 1 according to a "Dry colouring" process for 10 minutes at room temperature and then extruded. From this product, fibres having a titre of 15 dtex can be spun. These fibres have excellent tearability after artificial light aging of 200, 400, 600 and 800 hours compared to a not artifically aged coloured fibre. The artificial light aging of 400 hours shows a tearability of 57% compared to the unexposed untreated sample.

Application Examples A and B and C can be repeated using instead of the pigment of Example 1, an equivalent amount of any one of the products of Examples 2–43 inclusive.

We claim:
1. A pigment of the formula

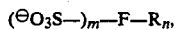

wherein
F is the residue of a dye,
each R is a group containing an aliphatic-, cycloaliphatic-or aliphatic-heterocyclic-bound protonated sterically hindered amine group and
m and n are both 1 or both 2,
or a pigment containing at least two recurring units of said formula, wherein the protonated group of one unit is associated with the —SO$_3^\ominus$ group of another unit.

2. A pigment according to claim 1 having the formula

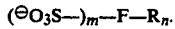

3. A pigment according to claim 1 having the formula

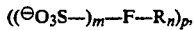

wherein p is 2 to 30.

4. A pigment according to claim 2 or 3 wherein each R is

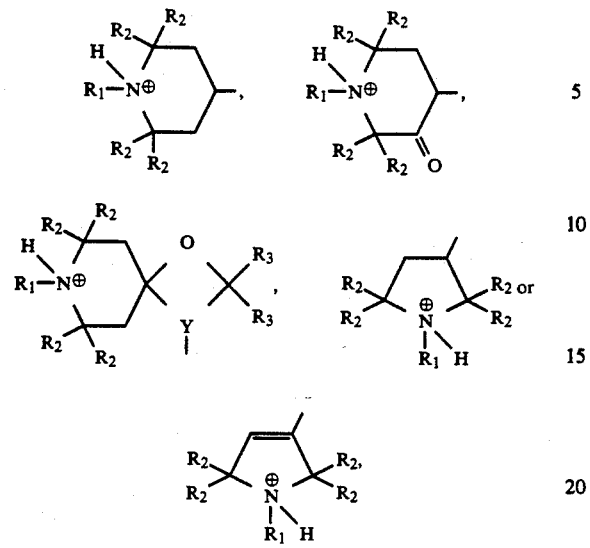

wherein
R₁ is hydrogen, $C_{1-4}$alkyl, $C_{1-4}$alkoxy or ($C_{1-4}$alkyl)-carbonyl,
each R₂ is independently $C_{1-4}$alkyl,
each R₃ is independently hydrogen, $C_{1-4}$alkyl or phenyl, with the proviso that not more than one R₃ is phenyl, or
both R₃'s together are —(CH₂)₁₁—, and $$-Y-\text{ is }-\overset{*}{N}-CO-\text{ or }-CO-\overset{*}{N}-,$$

wherein the * denotes the atom attached to the carbon atom bearing the R₃'s.

5. A pigment according to claim 4 wherein each R is 2,2,6,6-tetramethylpiperidinium-4-yl or 1,2,2,6,6-pentamethylpiperidinium-4-yl.

6. A pigment according to claim 2 or 3 wherein F is the residue of a monoazo, disazo, anthraquinone, perinone or isoindoline dye.

7. A pigment according to claim 6 having the formula

D—N=N—K, wherein
D is phenyl or phenyl substituted by 1 to 3 substituents each of which is independently halo, $C_{1-4}$alkyl, $C_{1-4}$-alkoxy, —SO₂N(R₄)₂, ($C_{1-4}$alkoxy)carbonyl, —SO₃⁻, —CO—NH—R″, —SO₂—NH—R″ or —COO—R″, wherein each R₄ is independently hydrogen or $C_{1-4}$-alkyl, with the provisos that (i) D contains a maximum of two —SO₃⁻ groups, (ii) D contains a maximum of two R″ groups and (iii) when D contains one or two —SO₃⁻ groups, it contains no R″ group, and
K is

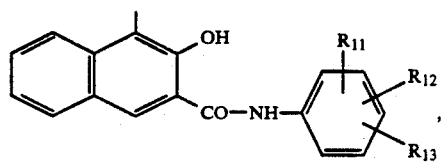

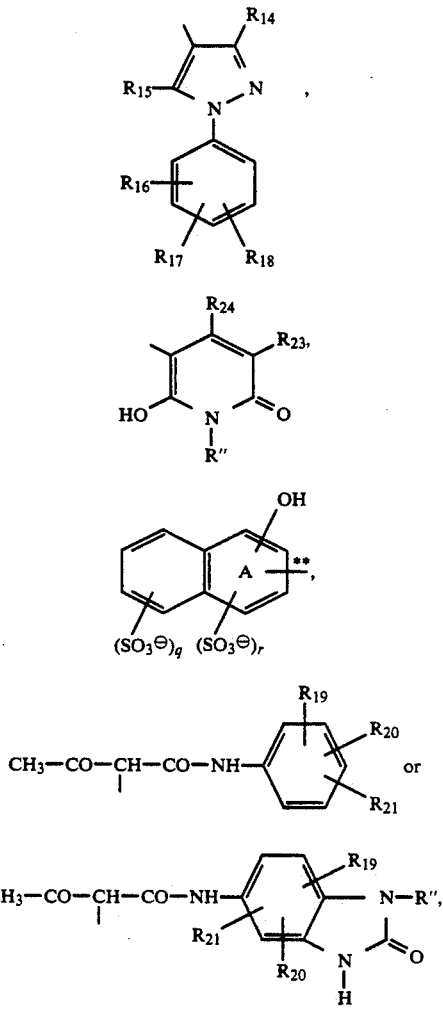

wherein
R₁₁ is —SO₃⁻, —CO—NH—R″, —SO₂—NH—R″ or —COO—R″,
R₁₂ is hydrogen, $C_{1-4}$alkyl, $C_{1-4}$alkoxy or halo,
R₁₃ is hydrogen, $C_{1-4}$alkyl, $C_{1-4}$alkoxy or halo,
R₁₄ is $C_{1-2}$alkyl or —CONH₂,
R₁₅ is hydroxy or amino,
R₁₆ is —SO₃⁻, —CO—NH—R″, —SO₂—NH—R″ or —COO—R″,
R₁₇ is hydrogen, halo, $C_{1-4}$alkyl, $C_{1-4}$alkoxy or —SO₃⁻, with the proviso that R₁₇ may be —SO₃⁻ only when R₁₆ is —SO₃⁻,
R₁₈ is hydrogen, chloro or methyl,
R₁₉ is hydrogen, —SO₃⁻, —CO—NH—R″, —SO₂—NH—R″ or —COO—R″,
R₂₀ is hydrogen, halo, $C_{1-4}$alkyl or $C_{1-4}$alkoxy,
R₂₁ is hydrogen, chloro or methyl,
R₂₃ is hydrogen or cyano,
R₂₄ is $C_{1-4}$alkyl, cyclohexyl or phenyl,
q is 0, 1 or 2,
r is 0 or 1, with the proviso that q+r is 1 or 2, and on Ring A the hydroxy group is in the 1-position and the bond denoted by the  is in the 2-position or the hydroxy group is in the 2-position and the bond denoted by the  is in the 1-position,
wherein each R" is

[structures showing piperidinium rings with R1, R2 substituents, and variant with =O, and with Y linker containing R3 groups, and open-chain ammonium variants]

wherein
R₁ is hydrogen, $C_{1-4}$alkyl, $C_{1-4}$alkoxy or ($C_{1-4}$alkyl)carbonyl, each R₂ is independently $C_{1-4}$alkyl, each R₃ is independently hydrogen, $C_{1-4}$alkyl or phenyl, with the proviso that not more than one R₃ is phenyl, or both R₃'s together are —(CH₂)₁₁—, and —Y— is $-\overset{*}{N}-CO-$ or $-CO-\overset{*}{N}-$,
         |                      | wherein the * denotes the atom attached to the carbon atom bearing the R₃'s, with the proviso that D and K together contain one $-SO_3^{\ominus}$ group and one R" group or two $-SO_3^{\ominus}$ groups and two R" groups.

8. A pigment according to claim 7 wherein D and K together contain one $-SO_3^{\ominus}$ group and one R" group.

9. A pigment according to claim 8 wherein each R" is 2,2,6,6-tetramethylpiperidinium-4-yl or 1,2,2,6,6-pentamethylpiperidinium-4-yl.

10. A pigment according to claim 8
wherein D is phenyl or phenyl substituted by one or two substituents each of which is independently chloro, methyl, methoxycarbonyl, $-SO_3^{\ominus}$ or

[structure: —CO—NH— attached to piperidinium ring with R₂ groups, ⊕N—R₁, H]

11. A pigment according to claim 10 wherein
D is phenyl or phenyl substituted by one or two substituents each of which is independently chloro, methyl, methoxycarbonyl, $-SO_3^{\ominus}$ or

[structure: —CO—NH— attached to tetramethylpiperidinium ring, ⊕N—R'₁, H]

wherein R'₁ is hydrogen or methyl.

12. A polymeric material to which a pigment according to claim 1 was applied.

* * * * *